United States Patent
Raaf et al.

(10) Patent No.: US 9,936,419 B2
(45) Date of Patent: Apr. 3, 2018

(54) NETWORK NODES AND METHODS FOR TRANSMITTING LOW-LATENCY DATA IN A RADIO COMMUNICATIONS SYSTEM

(75) Inventors: Bernhard Raaf, Neuried (DE); Esa Tapani Tiirola, Kempele (FI); Frank Frederiksen, Klarup (DK)

(73) Assignee: Nokia Solutions and Networks Oy, Espoo (FI)

(*) Notice: Subject to any disclaimer, the term of this patent is extended or adjusted under 35 U.S.C. 154(b) by 219 days.

(21) Appl. No.: 14/401,909

(22) PCT Filed: May 18, 2012

(86) PCT No.: PCT/EP2012/059311
§ 371 (c)(1),
(2), (4) Date: Feb. 11, 2015

(87) PCT Pub. No.: WO2013/170905
PCT Pub. Date: Nov. 21, 2013

(65) Prior Publication Data
US 2015/0230128 A1    Aug. 13, 2015

(51) Int. Cl.
*H04W 28/06* (2009.01)
*H04L 1/00* (2006.01)
*H04W 28/02* (2009.01)

(52) U.S. Cl.
CPC ......... *H04W 28/06* (2013.01); *H04L 1/0075* (2013.01); *H04L 1/0082* (2013.01); *H04W 28/0289* (2013.01); *H04L 2001/0097* (2013.01)

(58) Field of Classification Search
None
See application file for complete search history.

(56) References Cited

U.S. PATENT DOCUMENTS

| 7,051,259 | B1 | 5/2006 | Williams, Jr. et al. | 714/752 |
| 2002/0126675 | A1* | 9/2002 | Yoshimura | H04L 47/10 370/395.21 |
| 2003/0210710 | A1* | 11/2003 | Odman | H04L 1/1614 370/471 |
| 2004/0033801 | A1* | 2/2004 | Yi | H04L 69/04 455/428 |
| 2004/0146067 | A1* | 7/2004 | Yi | H04W 28/06 370/474 |
| 2006/0153232 | A1* | 7/2006 | Shvodian | H04W 28/065 370/468 |
| 2006/0168503 | A1* | 7/2006 | Schroeder | G06F 11/1064 714/798 |

(Continued)

OTHER PUBLICATIONS

Andrey Brito et al: "Speculative Out-Of-Order Event Processing With Software Transaction Memory"; DEBS'08 Proceedings of the second international conference on Distributed event-based systems, pp. 265-275, ACM New York, 2008, ISBN: 978-1-60558-090-6.

*Primary Examiner* — Andrew Lai
*Assistant Examiner* — Jamaal Henson
(74) *Attorney, Agent, or Firm* — Harrington & Smith (57) ABSTRACT

The present invention refers to methods and network nodes transmitting data in a radio communications system. In particular, the present invention refers to a method including the steps of receiving a portion of a data unit; and starting a processing of the portion of the data unit prior to receiving remaining portions of the data unit, and to a network node configured for executing the method.

18 Claims, 7 Drawing Sheets

(56) References Cited

U.S. PATENT DOCUMENTS

| | | | |
|---|---|---|---|
| 2006/0253768 A1* | 11/2006 | King | H04L 1/0061 |
| | | | 714/758 |
| 2007/0139229 A1 | 6/2007 | Berens | 341/50 |
| 2008/0101354 A1* | 5/2008 | Arndt | H04L 47/10 |
| | | | 370/389 |
| 2008/0310324 A1* | 12/2008 | Chaponniere | H04L 47/10 |
| | | | 370/254 |
| 2012/0309320 A1* | 12/2012 | Thyagarajan | H04L 41/142 |
| | | | 455/67.11 |

* cited by examiner

NETWORK NODES AND METHODS FOR TRANSMITTING LOW-LATENCY DATA IN A RADIO COMMUNICATIONS SYSTEM

FIELD OF THE INVENTION

The present invention relates to transmitting data in a radio communications system. Particularly, the present invention refers to methods for the transmitting; and network nodes configured to perform the transmitting.

BACKGROUND OF THE INVENTION

In current system designs for mobile or wireless communication, in particular in the context of the $3^{rd}$ Generation Partnership Project (3GPP), there is a clear tendency to optimize the standardized system primarily for maximum spectral efficiency and maximized data throughput. Additionally, latency is a key issue as well, which is also under consideration when specifying systems and their operation.

One-way latency in a communications system is defined as the delay from when a data packet is available for transmission in one end until it is available for further processing in the receiving end, while two-way or round-trip latency is the sum of the latencies in both directions, e.g. the time it takes for a response on a packet to become available at the transmitter of that packet.

Latency will limit the achievable data rate, and is inherent in all protocols, as e.g. TCP/IP, for basically all applications. As an example, whenever a handshaking between peers on both sides of a communication line is needed e.g. in a request-response way, one peer needs to wait until information is sent to the other peer and subsequently the answer is received. This waiting time, i.e. the latency, limits the achievable throughput in practice, even if an unlimited amount of data could be sent per time interval.

Latency is in particular an issue for multi-hop or relaying systems where data have to transverse several hops where each link between nodes will have its own individual Hybrid automatic repeat request (HARQ) loop, but latency could also be an issue for conventional single hop systems.

There are several ways to increase throughput, partly by increasing the spectral efficiency but mainly by exploiting more resources, e.g. using more base stations, more spectrum and more antennas per base station and user equipment (UE).

It is much harder to improve latency: the main tools are to reduce the time span of a physical layer packet (smaller Transmission Time Interval TTI, currently 1 ms in LTE after 2 ms in HSDPA and 10 ms in UMTS), decrease cell sizes in order to reduce the travel time of the signals (speed of light), or more generally put peer nodes as close as possible to the UE (e.g. from RNC in UMTS to the eNB in LTE) and to do the processing in the nodes quicker. The first cost spectral efficiency due to increased control overhead, while the second requires more base stations and more functionality to be implemented in them and the latter costs more powerful processing elements.

It is therefore a problem to reduce the latency in current communication systems, and thus there is still a need for an improved method for processing data in a radio communications network.

SUMMARY OF THE INVENTION

Object of the present invention is improving of data transmission in a radio communications system.

This object is achieved by a method for transmitting data in a radio communications system comprising the steps of receiving a portion of a data unit; and starting a processing of the portion of the data unit prior to receiving remaining portions of the data unit.

As an advantage of the method the overall transmission latency in the radio communications network is improved.

According to some embodiments of the present invention, the processing comprises a forwarding of the portion of the data unit.

According to further embodiments of the present invention, the method further comprises the step of checking the data unit for eligibility for further processing.

As an advantage, the method allows for a low latency yet robust signaling scheme by checking the eligibility of the data unit.

According to further embodiments of the present invention, the method further comprises the step of receiving a further portion of the data unit, wherein the step of checking is based on the further portion of the data unit.

According to further embodiments of the present invention, the checking comprises checking of each received portion of the data unit.

As an advantage, each transmitted portion of the data unit can be checked individually regarding its eligibility, as well as the data unit as a whole.

According to further embodiments of the present invention, the method further comprises one or more of the following steps of:

sending a speculation indication, the speculation indication indicating a possible recalling of the data unit in case that the checking results in the data unit not to be considered eligible for further processing;

sending a confirmation indication, the confirmation indication indicating that the checking results in the data unit being considered eligible for further processing;

sending a cancellation indication, the cancellation indication indicating that the data unit and/or any portion of the data unit is to be cancelled;

sending an instruction for preferred processing of the data unit, indicating a preferred processing of the data unit;

sending an instruction for deferred processing of the data unit, indicating a deferred processing of the data unit; or sending, in case of the checking indicating that a previously received portion of the data unit is not considered eligible for further processing, a corrective information, the corrective information allowing for correcting the previously received portion of the data unit.

As an advantage, the overall system latency is reduced as processing of the data unit, or at least processing of portions of the data unit, can already start prior to receiving the complete data unit. In case of a data unit which later turns out not to be eligible for further processing, the speculation indication allows to prepare for a later cancelling, thereby reducing the processing time necessary for the actual cancelling and avoiding non cancellable or non revertible effects.

According to further embodiments of the present invention, the method further comprises the step of assigning an identification to the data unit, the identification allowing to uniquely identify the data unit.

As an advantage, portions of the data unit as well as speculation indications, confirmation indications, cancelling indications or instructions for preferred or deferred processing can easily be linked to the respective portions during the processing.

According to further embodiments of the present invention, the method further comprises the step of assigning a likelihood value to the data unit, the likelihood value indicating a likelihood for a need for a correction or a cancelling of the data unit.

As an advantage, it is possible to take precautions regarding a possible correcting or cancelling of the data unit and assign processing resources more optimally by prioritizing such data units that have a lower risk of requiring cancellation or correction later on.

The object of the present invention is also achieved by a method for transmitting data in a radio communications system comprising one or more of the following steps:
  forwarding, upon receiving a portion of a data unit comprising a speculation indication, the portion of the data unit, and preparing for a possible cancelling of the data unit;
  postponing, upon receiving a portion of a data unit comprising a speculation indication, a forwarding of the portion of the data unit until a confirmation indication is received;
  forwarding, upon receiving a confirmation indication, the portion of the data unit and any previously received, postponed portions of the data unit;
  cancelling, upon reception of a cancelling indication, the data unit and/or any portion of the data unit;
  correcting, upon receiving a corrective information, a previously received portion of the data unit which is not considered eligible for further processing, and forwarding the corrected previously received portion of the data unit; or
  finalizing, upon complete reception of the data unit, the transmitting of the data unit.

As an advantage of the method, the overall transmission latency in the radio communications network is improved.

According to some embodiments of the present invention, the method further comprises the step of interpreting, after a defined time or upon complete reception of the data unit, a missing of a cancellation indication in the data unit as a confirmation indication for the data unit.

As an advantage, signaling overhead is reduced, as it is not necessary to send an explicit confirmation indication, and instead interpret the absence of a cancelling indication after a certain, defined time or in the last portion of the data unit as confirmation indication.

The object of the present invention is also achieved by a network node configured for transmitting data in a radio communications system, the network node comprising:
  receiving means configured for receiving a portion of a data unit; and
  processing means configured for starting a processing of the portion of the data unit prior to receiving remaining portions of the data unit.

As an advantage of the network node, the overall transmission latency in the radio communications network is improved.

The object of the present invention is also achieved by a network node configured for transmitting data in a radio communications system, comprising one or more of the following:
  forwarding means configured for forwarding, upon receiving a portion of a data unit comprising a speculation indication, the portion of the data unit, and preparing for a possible cancelling of the data unit;
  postponing means configured for postponing, upon receiving a portion of a data unit comprising a speculation indication, a forwarding of the portion of the data unit until a confirmation indication is received;
  forwarding means configured for forwarding, upon receiving a confirmation indication, the portion of the data unit and any previously received, postponed portions of the data unit;
  cancelling, upon reception of a cancelling indication, the data unit and/or any portion of the data unit;
  correcting means configured for correcting, upon receiving a corrective information, a previously received portion of the data unit which is not considered eligible for further processing, and forwarding the corrected previously received portion of the data unit; or
  finalizing means configured for finalizing, upon complete reception of the data unit, the transmitting of the data unit.

As an advantage of the network node, the overall transmission latency in the radio communications network is improved.

Further embodiments of the present invention are provided with the corresponding dependent claims.

BRIEF DESCRIPTION OF THE DRAWINGS

The present invention will be more clearly understood from the following description of the preferred embodiments of the invention read in conjunction with the attached drawings, in which.

DESCRIPTION OF THE PREFERRED EMBODIMENTS

According to the present invention, it is proposed to introduce speculative processing and speculative communication into mobile or wireless communications systems, in particular to protocol stacks. Communications in such a communications system is mainly done on data units, or data packages. Typical examples are so-called protocol data units (PDUs). However, the present invention applies to any kind of data units to be transmitted from one network node, or sender, to another network node, or receiver. The transmitting of data units can furthermore comprise a relay node, or hop, which acts as a receiver in one step of the method and as a sender in a further step of the method, as it receives a data unit transmitted from the original sender and forwards the data unit to the final receiver.

Typically a network node, or protocol entity, only starts processing of a PDU after the PDU has been fully received from the next lower or higher or peer protocol entity. According to some embodiments of the present invention, it is proposed to already start early to forward partial PDUs, or portions of a data unit, to the next protocol entity to allow that one to start working on the initial part, or portion, of the PDU as well.

Figure 1:
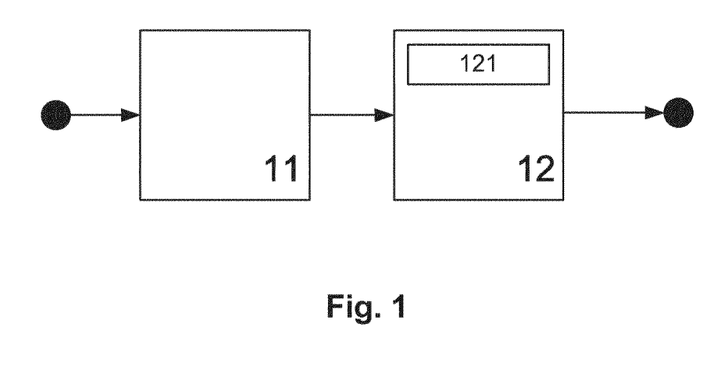
FIG. 1 shows an implementation of the present invention according to some embodiments of the present invention.

Accordingly, FIG. 1 shows a method for transmitting data in a radio communications system. The method comprises the steps of receiving 11 a portion of a data unit, and starting a processing 12 of the portion of the data unit prior to receiving remaining portions of the data unit. It should be noted that already the first network node, or protocol entity, in a chain receives a portion of a data unit, e.g. from a data source, another protocol layer, or a user.

According to further embodiments, as shown in FIG. 1, the processing 12 further comprises a forwarding 121 of the portion of the data unit. This applies, for instance, in case of a relay node, or hop, involved in the transmitting.

Figure 2:
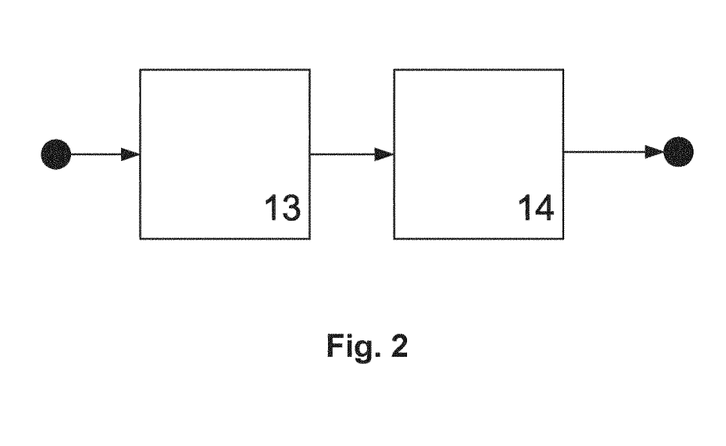
FIG. 2 shows an implementation of the present invention according to some embodiments of the present invention.

According to further embodiments of the present invention, as shown in FIG. 2 the method further comprises the steps of receiving 13 a further portion of the data unit, and checking 14, based on the further portion of the data unit, the data unit for eligibility for further processing. A typical example is an approach called Cyclic Redundancy Check (CRC), which adds information at the end of a data unit, or packet, that is used to identify and catch incorrectly received data units. According to some embodiments of the invention, the further portion of the data unit comprises control data.

However, it is not necessary to receive the further portion of the data unit in order to check the data unit for eligibility for further processing. The checking is also possible based on other measures. Examples are cases where there is some additional side information available on the data. One example would be multiple CRC sums which cover only part of the data unit, or a pre-knowledge on certain aspects of the data unit e.g. some fields may only contain values of a certain predefined range to be eligible. Then a data unit can be determined not to be eligible based only on parts of that data unit e.g. if there is a field with illegal value or a partial CRC sum doesn't match. On the other hand some parts of a data unit may have any content, say a free payload part after the header, then there data unit can be determined to be eligible for forwarding after checking the header as there is no constraint on the payload and therefore no risk for an ineligible payload.

The checking 14 comprises, according to further embodiments of the invention, checking of each received portion of the data unit.

In case of the checking 14 resulting in the data unit not to be considered eligible for further processing, i.e. the data unit being incorrectly received or being not or no longer valid for some reason, the invention proposes to provide a kind of "emergency break" to allow to cancel processing of an already forwarded and/or speculatively executed or speculatively communicated PDU in case it is determined eventually that the PDU should not have been forwarded and/or executed. Furthermore, the invention proposes to allow for data units to be processed in a preferred or deferred manner, as well as for providing corrective information to correct a previously, incorrectly received portion of the data unit.

Figure 3:
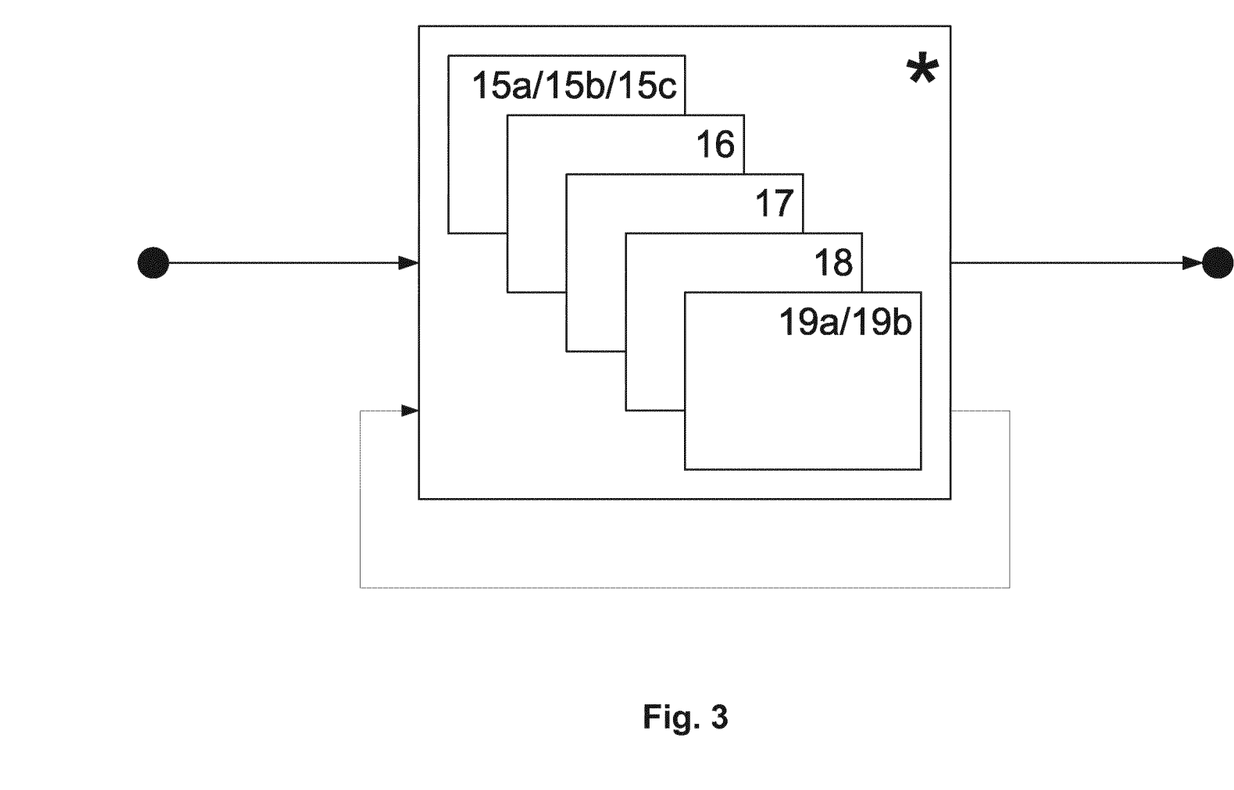
FIG. 3 shows an implementation of the present invention according to some embodiments of the present invention.

In particular, as shown in FIG. 3, according to some embodiments of the invention the method further comprises one or more of the following steps:

Sending 15a a speculation indication, the speculation indication indicating a possible recalling of the data unit in case that the checking 14 results in the data unit not to be considered eligible for further processing. The speculation indication to the next entity can be used to make it aware there may be a need to revoke the data unit. This indication can be protocol entity and/or PDU-specific. Even before receiving the final confirmation of the data unit, the peer can already forward the data unit to further communication entities, again with a speculation indication and possibly cancelling it if the original data unit was cancelled. In a similar way the speculation indication can be chained over different protocol layers or entities.

Sending 15b a confirmation indication, the confirmation indication indicating that the checking 14 results in the data unit being considered eligible for further processing. In the case the whole data unit received by next higher or lower protocol entity is true, the processing of the data unit is continued as usual. For this purpose, instead of the speculation indication, or emergency break, a confirmation information can be sent, confirming the sent data unit is valid.

Sending 15c a cancellation indication, the cancellation indication indicating that the data unit and/or any portion of the data unit is to be cancelled. Cancelling here can also be understood as nullifying the data unit, or declaring it as invalid.

Sending 16, 17 an instruction for preferred or deferred processing of the data unit, indicating a preferred or deferred processing of the data unit, i.e. the data unit is to be processed earlier or later than other data units. When receiving several PDUs, or data units, this allows to start processing the ones that e.g. would be most easily corrected, i.e. one that has only limited impact. As an example, it is proposed to rather process an ordinary data unit that simply causes a corresponding data unit to be forwarded to the next entity rather than a release message that would cause a release of the connection and significant changes to the internal states and variables.

Sending 18, in case of the checking 14 indicating that a previously received portion of the data unit is not considered eligible for further processing, a corrective information, the corrective information allowing for correcting the previously received portion of the data unit. In case only a part of the data unit is false, the corrective information can be applied to the data unit as follows: The receiver stores the partially correctly received PDU. The transmitter (re)-transmits the missing or erroneous (part of) the PDU or an information allowing to correct erroneous parts. The receiver reassembles the PDUs until a complete data unit corresponding to next protocol entity is received. The next entity (i.e. in the receiver) can then either decide to cancel the original data unit and send a cancellation indication to the next entity and instead process the correct data unit, or correct the action, e.g. send itself a corrective information to the next entity. The latter typically applies if the correction applies to the data-payload rather than to the header of the data unit, while the former would typically be done if the header happens to turn out to have been corrupted. Errors introduced by transmission errors on portions on the data unit, or sub-packets, which form a PDU can also be covered by this means: the receiver does not have to wait for the correct reception of the entire PDU but can already react on it and (at least partially) forward it. Once the missing portion of the data unit, or subpacket, arrives it is forwarded as a corrective information to the next entity to complete the PDU that was already (partially) forwarded. Instead of sending deliberately an erroneous portion of the data unit, it is also possible to indicate explicitly where a part is missing. This avoids that the next entity triggers unnecessary actions which would most likely have to be cancelled.

Furthermore, according to some embodiments of the invention, as shown in FIG. 3 the method further comprises the step of assigning 19a an identification to the data unit, the identification allowing to uniquely identify the data unit. This is in particular helpful to link the above described indications and instructions to the respective data unit, as assigning a specific identification to a forwarded PDU enables to later on associate cancellation or corrections to the correct PDU. Alternatively the linking can be done in an implicit way, e.g. similarly as in a synchronous HARQ scheme.

According to further embodiments of the invention, as shown in FIG. 3 the method further comprises the step of assigning 19b a likelihood value to the data unit, the likelihood value indicating a likelihood for a need for a correction or a cancelling of the data unit. I.e. it is proposed to add an indication of the likelihood that the PDU may need to be corrected or cancelled in order to assist the peer which PDUs to process with priority. Basically the receiver is well advised to prioritize the data units that have a low likelihood of needing to be cancelled or corrected. E.g. if two data units are received simultaneously, the one that is less prone to be cancelled is forwarded first and only later the other ones. Prioritizing in this way the risk that the already forwarded portions of the data unit will need to be cancelled is minimized, as these units would have been forwarded in vain. The likelihood that forwarded portions of data units can be maintained is maximized; these have been then forwarded usefully.

With regard to FIG. 3, is has to be noted that the steps 15a, 15b, 15c, 16, 17, 18, 19a, 19b do not need to be executed in sequence, nor is it necessary to execute all of these steps. The asterisk indicates that one or more of the steps 15a, 15b, 15c, 16, 17, 18, 19a, 19b can be executed in any sequence, and each step can be executed once or several times or not at all during the process of transmitting a data unit.

Figure 4:
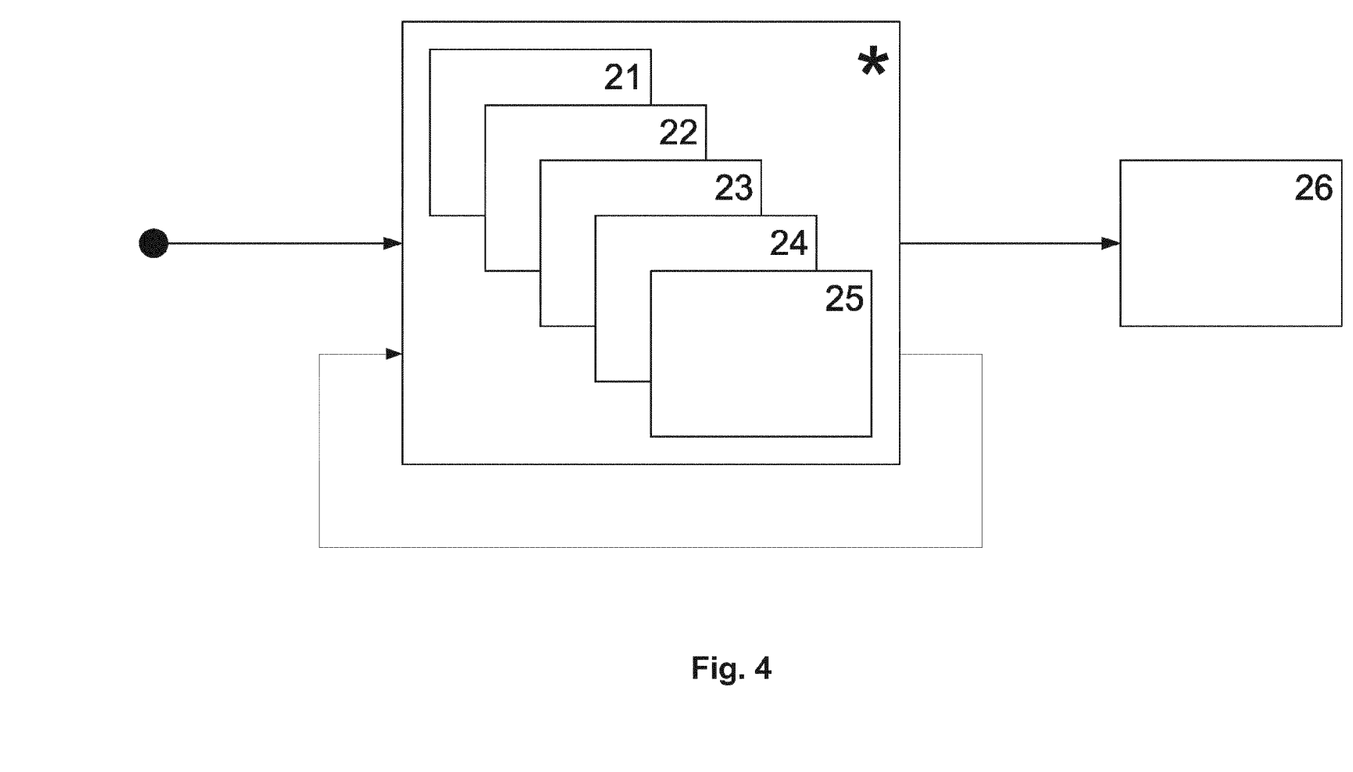
FIG. 4 shows an implementation of the present invention according to some embodiments of the present invention.

FIG. 4 shows another implementation according to some embodiments of the current invention. As shown in FIG. 4, the proposed method for transmitting data in a radio communications system comprises one or more of the following steps:

Forwarding 21, upon receiving a portion of a data unit comprising a speculation indication, the portion of the data unit, and preparing for a possible cancelling of the data unit. The following examples show how such a preparing for cancelling can be implemented in different cases. The data unit may e.g. cause data to be stored in a database, then the previous, overwritten content of the database may be temporarily stored to allow the original state of the database to be restored in case a cancellation becomes necessary. In order to avoid further changes to the entry in the database, the entry may be held locked to make sure it remains available for being restored. Any actions that cannot be reverted, e.g. deletion of entire records in the database can be postponed to make sure the cancelling is not impossible. Another example is that in response to the data unit some information is to be retrieved and sent (e.g. back to the requestor, in this case the information may already be retrieved and prepared for sending i.e. formatted in a suitable way but not be sent yet. In particular changes to the outside of the device which may easily happen in control applications like igniting an oven, detaching some physical units or printing and ejecting some information/goods from a machine e.g. vending machine all actions that can typically not be reverted easily, are prepared, e.g. the oven may be pre-heated the fixture of the unit being prepared for unlocking, the goods of the vending machine retrieved from storage and aligned with the release hole, but the action is not finally and irreversibly being executed.

Postponing 22, upon receiving a portion of a data unit comprising a speculation indication, a forwarding of the portion of the data unit until a confirmation indication is received. This is in particular applicable in case the subsequent processing unit or step does not support handling of cancellation indications e.g. because it is a legacy device not having implemented the invention.

Forwarding 23, upon receiving a confirmation indication, the portion of the data unit and any previously received, postponed portions of the data unit.

Cancelling 24, upon reception of a cancelling indication, the data unit and/or any portion of the data unit. The following examples show how such a cancelling can be implemented in different cases. In case of a database, any change being done can be reverted, also called rerolled including any potential subsequent changes i.e. changes that had been done in response to the change that is cancelled. Another example is that information that has been retrieved in response to the data unit to be sent subsequently and prepared for sending is discarded. Physical changes to the outside of the device are not done and any preparations are reverted e.g. an oven is not ignited but let cool down again, physical units are not detached but on the contrary re-secured, and retrieved goods are not ejected but brought back into the storage.

Correcting 25, upon receiving a corrective information, a previously received portion of the data unit which is not considered eligible for further processing, and forwarding the corrected previously received portion of the data unit. According to some embodiments of the invention, upon receiving a corrective information, a previously received portion of the data unit is cancelled, and a new, correct copy of the portion of the data unit is transmitted.

Finalizing 26, upon complete reception of the data unit and/or a confirmation indication, the transmitting of the data unit. The following examples show how such a finalizing can be implemented in different cases. In case of a database, any change being done are submitted to the database and the records are unlocked so further action can be done on the new values by other processes and any previously stored values or information to reroll the transaction can be discarded. Another example is that information that has been retrieved in response to the data unit is finally sent. Physical changes to the outside of the device can now finally be done e.g. an oven is ignited, physical units are detached, and retrieved goods are now ejected by the vending machine.

Figure 5:
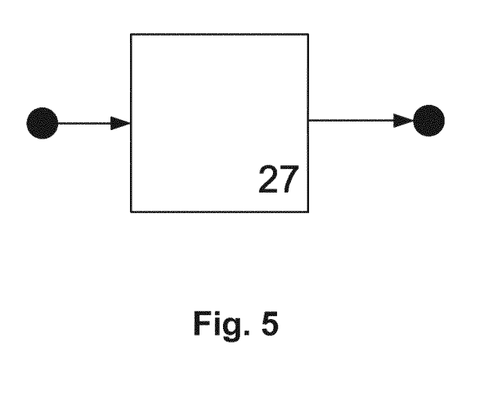
FIG. 5 shows an implementation of the present invention according to some embodiments of the present invention.

FIG. 5 shows another implementation according to some embodiments of the current invention. As shown in FIG. 5, the method further comprises the step of interpreting 27, after a defined time or upon complete reception of the data unit, a missing of a cancellation indication unit as a confirmation indication for the data unit.

Figure 6:
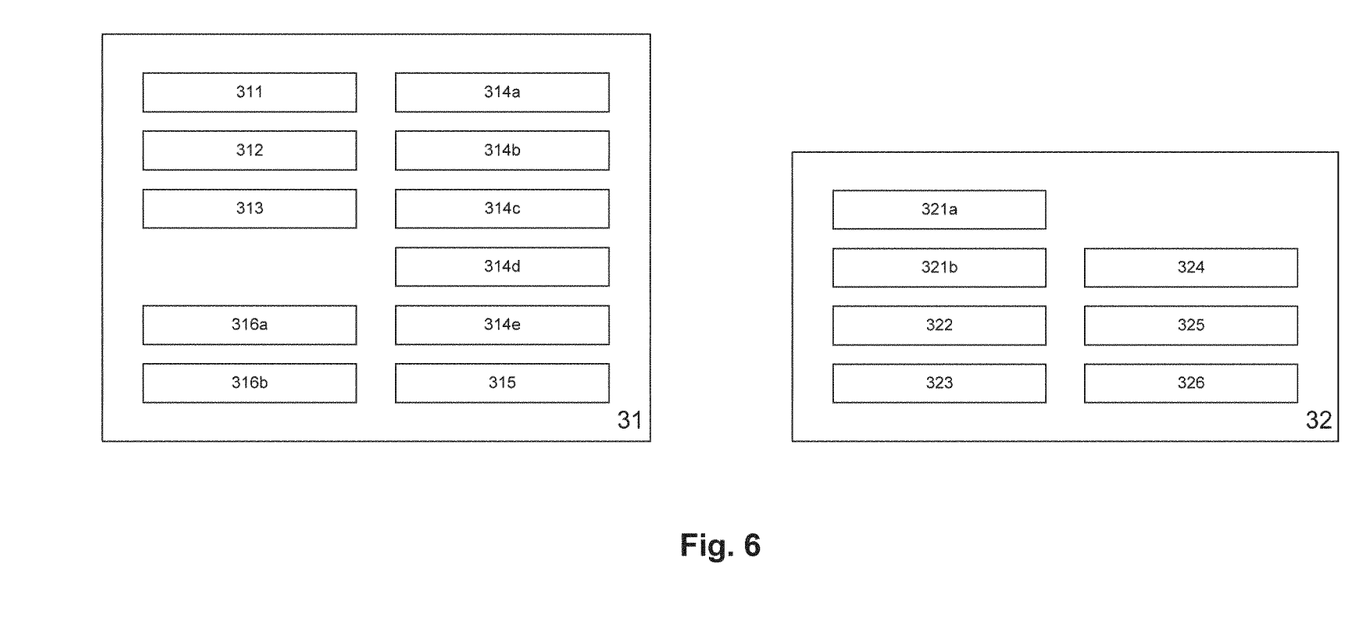
FIG. 6 shows an implementation of the present invention according to some embodiments of the present invention.

FIG. 6 shows another implementation according to some embodiments of the current invention. In particular, FIG. 6 shows a network node 31 configured for transmitting data in a radio communications system, the network node comprising:

receiving means 311 configured for receiving a portion of a data unit; and processing means 312 configured for starting a processing of the portion of the data unit prior to receiving remaining portions of the data unit.

According to further embodiments, the processing means 312 are further being configured for forwarding the portion of the data unit.

According to some embodiments, the network node 31 further comprises checking means 313 configured for checking, based on a further portion of the data unit, the data unit for eligibility for further processing.

According to further embodiments, the network node 31 further comprises one or more of the following:

sending means 314a configured for sending a speculation indication, the speculation indication indicating a possible recalling of the data unit in case that the checking results in the data unit not to be considered eligible for further processing;

sending means 314b configured for sending a confirmation indication, the confirmation indication indicating that the checking results in the data unit being considered eligible for further processing;

sending means 315 configured for sending a cancellation indication, the cancellation indication indicating that the data unit and/or any portion of the data unit is to be cancelled;

sending means 314c configured for sending an instruction for preferred processing of the data unit, indicating a preferred processing of the data unit;

sending means 314d configured for sending an instruction for deferred processing of the data unit, indicating a deferred processing of the data unit; or sending means 314e configured for sending, in case of the checking indicating that a previously received portion of the data unit is not considered eligible for further processing, a corrective information, the corrective information allowing for correcting the previously received portion of the data unit.

According to some embodiments, the network node 31 further comprises assigning means 316a configured for assigning an identification to the data unit, the identification allowing to uniquely identify the data unit.

According to further embodiments, the network node 31 further comprises assigning means (316b) configured for assigning a likelihood value to the data unit, the likelihood value indicating a likelihood for a need for a correction or a cancelling of the data unit.

FIG. 6 also shows another implementation according to some embodiments of the current invention. In particular, FIG. 6 shows a network node 32 configured for transmitting data in a radio communications system, comprising one or more of the following:

forwarding means 321a configured for forwarding, upon receiving a portion of a data unit comprising a speculation indication, the portion of the data unit, and preparing for a possible cancelling of the data unit;

postponing means 322 configured for postponing, upon receiving a portion of a data unit comprising a speculation indication, a forwarding of the portion of the data unit until a confirmation indication is received;

forwarding means 321b configured for forwarding, upon receiving a confirmation indication, the portion of the data unit and any previously received, postponed portions of the data unit;

cancelling means 323 configured for cancelling, upon reception of a cancelling indication, the data unit and/or any portion of the data unit;

correcting means 324 configured for correcting, upon receiving a corrective information, a previously received portion of the data unit which is not considered eligible for further processing, and forwarding the corrected previously received portion of the data unit; or finalizing means 325 configured for finalizing, upon complete reception of the data unit, the transmitting of the data unit.

According to some embodiments, the network node 32 further comprises interpreting means 326 configured for interpreting, after a defined time or upon complete reception of the data unit, a missing of a cancellation indication in the data unit as a confirmation indication for the data unit.

Figure 7:
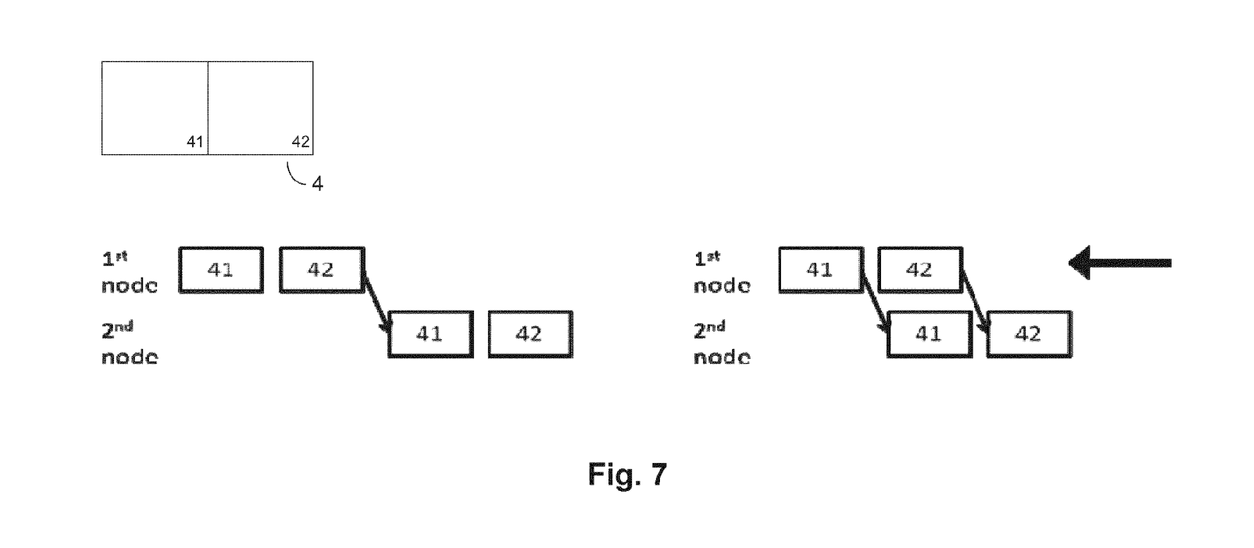
FIG. 7 shows an implementation of the present invention according to some embodiments of the present invention.

FIG. 7 shows another implementation according to some embodiments of the current invention. In particular, FIG. 7 shows a data unit 4, comprising a first portion 41 of the data unit 4 and a further portion 42 of the data unit 4. As described above, the data unit is forwarded in portions.

Furthermore, FIG. 7 shows on the left side a conventional forwarding of a data unit 4 from a first network node to a second network node. This can also be called one hop forwarding, as two network nodes are involved and the data unit has to take two hops. In the upper and lower row, portions of a data unit sent by the first and second network node are show. Time is indicated from the left to the right in FIG. 7.

As shown in FIG. 7, conventionally, a data unit 4 needs to be fully received at the first network node before being forwarded to the second network node. According to the present invention, however, the data unit 4, or in particular a portion 41, 42 of the data unit is forwarded early. As shown on the right side of FIG. 7, the first received portion 41 of the data unit 4 is forwarded already when only this first portion 41 was received. A second portion 42 of the data unit 4, and any further portion, is forwarded upon receiving it. The advantage of this approach is that the data unit 4 is received at the second network node earlier compared to the conventional forwarding method. The saved time is indicated by the thick black arrow in FIG. 7.

Figure 8:
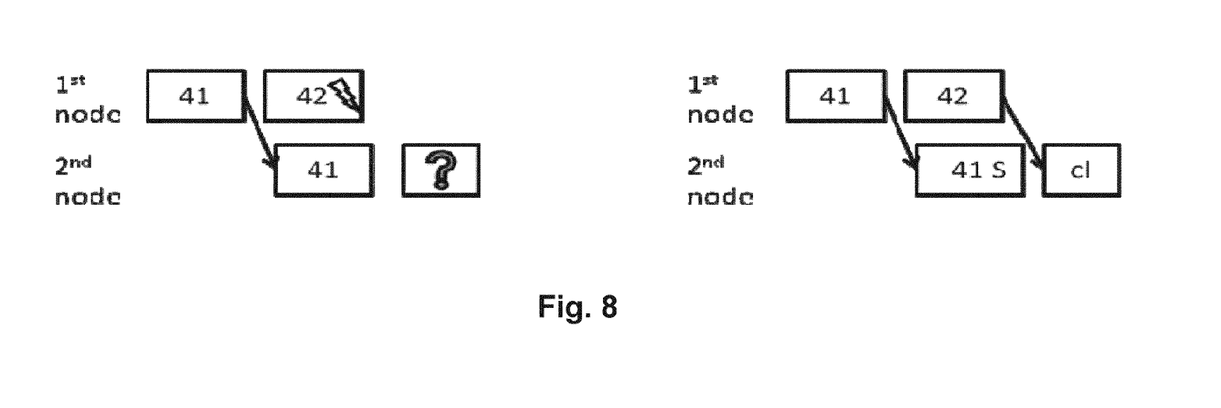
FIG. 8 shows an implementation of the present invention according to some embodiments of the present invention.

However, as described earlier, after an early forwarding of a first portion 41 of a data unit 4, a further portion 42 of the data unit 4 may turn out to be erroneous later. This is shown in FIG. 8. Conventionally, a data unit 4 turning out to be erroneous is simply not forwarded. However, according to the invention, the data unit 4 might already have been partly forwarded, i.e. a first portion 41 of the data unit 4 might have been forwarded earlier, as shown in FIG. 8 on the left. A further portion 42 of the data unit 4 then turns out to be erroneous.

To solve this problem, according to some embodiments of the present invention, if a first portion 41 of the data unit 4 was already forwarded, this first portion 41 is marked as being speculatively forwarded, indicated by an "s" in FIG. 8, right side. If the further portion 42 of the data unit 4 turns out to be erroneous, a cancelation indication is sent, indicated by a "cl" in FIG. 8, right side.

As an advantage of the method, already sent portions 41 of the data unit 4, or the data unit 4 as a whole, can be cancelled. The final recipient is aware that the data unit 4 may need to be revoked.

Figure 9:
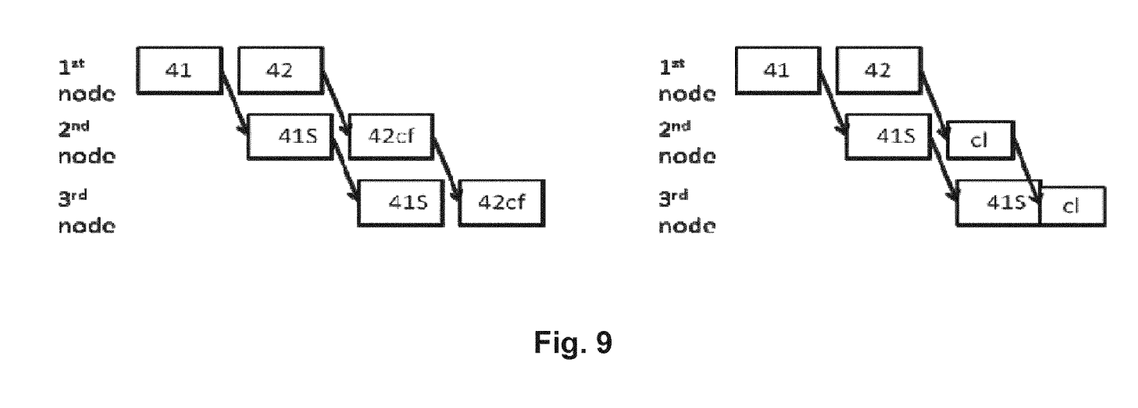
FIG. 9 shows an implementation of the present invention according to some embodiments of the present invention.

FIG. 9 shows another implementation according to some embodiments of the current invention. In particular, FIG. 9 shows the case of three network nodes being involved in the method. As shown on the left side of FIG. 9, portions 41, 42 of a not fully confirmed data unit 4 are forwarded with a speculation indication, indicated by "s" in FIG. 9, and only marked as confirmed with a confirmation indication later, indicated by "cf" in FIG. 9.

As shown on the right side of FIG. 9, if it turns out later that the data unit 4, or portions 41, 42 of the data unit 4, are invalid, a cancellation indication is forwarded, indicated by "cl" in FIG. 9.

Figure 10:
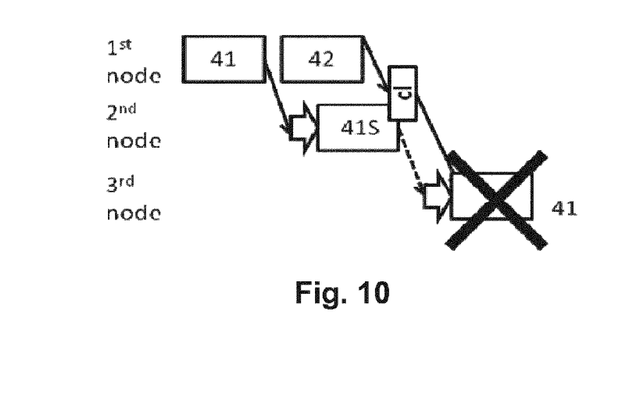
FIG. 10 shows an implementation of the present invention according to some embodiments of the present invention.

FIG. 10 shows another implementation according to some embodiments of the current invention. In particular, FIG. 10 shows an alternative handling on a subsequent hop: As shown in FIG. 10, if a forwarded cancellation indication arrives early enough, the forwarding of a first portion 41 of the data unit 4 can already be cancelled. This is applicable in particular if there is some processing involved in the network nodes in addition to a simple forwarding, and if the cancellation indication is forwarded quickly, e.g. as a small data packet. Then the cancellation indication may arrive in time to avoid forwarding the first portion 41 of the data unit 4 on the next hop, as indicated by the crossed out portion 41 of the data unit 4 in FIG. 10. The cancellation indication may also easily overtake previously sent portions, if those are marked as to be forwarded with lower priority or are marked as suffering a high risk of being subject to cancellation because intermediate nodes will then likely forward other portions instead.

The extra processing is indicated by a block arrow in FIG. 10. It is done in vain, and any additional side-effects e.g. to internal states will have to be cancelled or reverted as well subsequently (not shown in FIG. 10).

It should be noted that the proposed method of speculative forwarding of a data unit in a network can easily be used in conjunction with or on top of conventional network protocols, e.g. HARQ based on acknowledgements ACK/NACK, or any other flow and/or error control mechanisms. In particular any additional protocols on lower layers can be applied which are not shown in the figures and not explained in detail for the sake of clarity.

The proposed method can be applied to any processing layer from the physical layer to the application layer in the OSI model of the communication protocol, or any other layered model for acknowledged information exchange between two or more units.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

LIST OF ABBREVIATIONS

3GPP 3$^{rd}$ Generation Partnership Project
CRC Cyclic Redundancy Check
eNB enhanced Node B
HARQ Hybrid automatic repeat request
HSDPA High Speed Downlink Packet Access
LTE Long Term Evolution
PDU Protocol Data Unit
RNC Radio network controller
TTI Transmission Time Interval
UE User equipment
UMTS Universal Mobile Telecommunications System

LIST OF REFERENCES 11, 13 receiving
12 processing
121, 15c, forwarding
21, 23
14 checking
15a, 15b, sending
16, 17, 18
19a, 19b assigning
22 postponing
24 cancelling
25 correcting
26 finalizing
27 interpreting
31, 32 network node
311 receiving means
312 processing means
313 checking means
314a, 314b, sending means
314c, 314d,
314e
315, 321a, forwarding means
321b
316a, 316b assigning means
322 postponing means
323 cancelling means
324 correcting means
325 finalizing means
326 interpreting means
4 data unit
41, 42 portion of a data unit

The invention claimed is:

1. A method for transmitting data in a radio communications system comprising:
   receiving a portion of a data unit at a first protocol entity; and
   starting a processing of the portion of the data unit at the first protocol entity prior to receiving remaining portions of the data unit, wherein the processing comprises a forwarding of the portion of the data unit to a second protocol entity;
   determining at the first protocol entity whether the data unit is valid or invalid; and
   determining at the first protocol entity whether to send a cancellation indication, the cancellation indication indicating that the portion of the data unit is to be cancelled, wherein the cancellation indication is sent to the second protocol entity only if the data unit is deemed as invalid.

2. The method according to claim 1, the method further comprising:
   checking the data unit for eligibility for further processing.

3. The method according to claim 2, wherein the checking comprises checking each received portion of the data unit.

4. The method according to claim 2, the method further comprising one or more of the following:
   sending a speculation indication, the speculation indication indicating that a recalling of the data unit could be performed in case the checking results in the data unit not being considered eligible for further processing;

sending a confirmation indication, the confirmation indication indicating that the checking results in the data unit being considered eligible for further processing;

sending an instruction for preferred processing of the data unit, indicating a preferred processing of the data unit;

sending an instruction for deferred processing of the data unit, indicating a deferred processing of the data unit; or sending, in case of the checking indicating that a previously received portion of the data unit is not considered eligible for further processing, a corrective information, the corrective information allowing for correcting the previously received portion of the data unit.

5. The method according to claim 1, the method further comprising assigning an identification to the data unit, the identification allowing to uniquely identify the data unit.

6. The method according to claim 1, the method further comprising assigning a likelihood value to the data unit, the likelihood value indicating a likelihood for a need for a correction or a cancelling of the data unit.

7. A network node configured for transmitting data in a radio communications system, the network node comprising:

a memory including computer program code;

a processor, wherein the memory and the computer program code are configured, with the processor, to cause the network node to perform operations comprising:

receiving a portion of a data unit at a first protocol entity;

starting a processing of the portion of the data unit at the first protocol entity prior to receiving remaining portions of the data unit, wherein the processing comprises a forwarding of the portion of the data unit to a second protocol entity;

determining at the first protocol entity whether the data unit is valid or invalid; and determining at the first protocol entity whether to send a cancellation indication, the cancellation indication indicating that the portion of the data unit is to be cancelled, wherein the cancellation indication is sent to the second protocol entity only if the data unit is deemed as invalid.

8. The network node according to claim 7, wherein the memory and the computer program code are further configured, with the processor, to cause the apparatus to perform operations comprising:

checking the data unit for eligibility for further processing.

9. The network node according to claim 8, wherein the checking further comprises checking each received portion of the data unit.

10. The network node according to claim 9, wherein the memory and the computer program code are further configured, with the processor, to cause the apparatus to perform operations comprising one or more of the following:

sending a speculation indication, the speculation indication indicating that a recalling of the data unit could be performed in case that the checking results in the data unit not being considered eligible for further processing;

sending a confirmation indication, the confirmation indication indicating that the checking results in the data unit being considered eligible for further processing;

sending an instruction for preferred processing of the data unit, indicating a preferred processing of the data unit;

sending an instruction for deferred processing of the data unit, indicating a deferred processing of the data unit; or sending, in case of the checking indicating that a previously received portion of the data unit is not considered eligible for further processing, a corrective information, the corrective information allowing for correcting the previously received portion of the data unit.

11. The network node according to claim 7, wherein the memory and the computer program code are further configured, with the processor, to cause the apparatus to perform operations comprising: assigning an identification to the data unit, the identification allowing to uniquely identify the data unit.

12. The network node according to claim 7, wherein the memory and the computer program code are further configured, with the processor, to cause the apparatus to perform operations comprising: assigning a likelihood value to the data unit, the likelihood value indicating a likelihood for a need for correction or a cancelling of the data unit.

13. A method for receiving data in a radio communications system, comprising:

receiving a portion of a data unit at a second protocol entity;

receiving a cancellation indication at the second protocol entity, the cancellation indication indicating that the data unit has been deemed as invalid by a first protocol entity and the portion of the data unit is to be cancelled; and canceling the portion of the data unit at the second protocol entity.

14. The method of claim 13, wherein canceling the portion of the data unit comprises nullifying the portion of the data unit.

15. The method of claim 13, wherein canceling the portion of the data unit comprises declaring the portion of the data unit invalid.

16. The method of claim 13, wherein canceling the portion of the data unit comprises, for a database, reverting any change done to the database corresponding to the portion of the data unit.

17. The method of claim 13, wherein canceling the portion of the data unit comprises discarding information, to be sent subsequently and prepared for sending, that has been retrieved in response to the data unit.

18. A network node configured for receiving data in a radio communications system, the network node comprising:

a memory including computer program code;

a processor, wherein the memory and the computer program code are configured, with the processor, to cause the apparatus to perform operations comprising:

receiving a portion of a data unit at a second protocol entity;

receiving a cancellation indication at the second protocol entity, the cancellation indication indicating that the data unit has been deemed as invalid by a first protocol entity and the portion of the data unit is to be cancelled; and canceling the portion of the data unit at the second protocol entity.

* * * * *